United States Patent [19]

Hayashi et al.

[11] Patent Number: 5,569,719
[45] Date of Patent: Oct. 29, 1996

[54] VULCANIZABLE PARTIALLY HYDROGENATED NITRILE RUBBER COMPOSITION CONTAINING PARTIALLY HYDROGENATED UNSATURATED NITRILE-CONJUGATED DIENE COPOLYMER SULFUR VULCANIZER AND TELLURIUM DITHIOCARBAMATE VULCANIZATION PROMOTOR

[75] Inventors: Sachio Hayashi, Tokyo; Isamu Miyauchi, Takaoka; Motofumi Oyama, Yokosuka, all of Japan

[73] Assignee: Nippon Zeon Co., Ltd., Tokyo, Japan

[21] Appl. No.: 359,336

[22] Filed: Dec. 19, 1994

Related U.S. Application Data

[63] Continuation of Ser. No. 38,099, Mar. 30, 1993, abandoned.

[30] Foreign Application Priority Data

Mar. 31, 1992 [JP] Japan .................................. 4-106170

[51] Int. Cl.$^6$ .................................................. C08C 19/20
[52] U.S. Cl. ..................... 525/329.3; 525/348; 525/352
[58] Field of Search ............................................ 525/329.3

[56] References Cited

U.S. PATENT DOCUMENTS

| | | | |
|---|---|---|---|
| 1,875,997 | 9/1932 | Edland | 525/352 |
| 4,956,417 | 9/1990 | Hayashi | 14/338 |

OTHER PUBLICATIONS

EP 112109-A Jun. 27, 1984.

*Primary Examiner*—Christopher Henderson
*Attorney, Agent, or Firm*—Armstrong, Westerman, Hattori, McLeland & Naughton

[57] ABSTRACT

A vulcanizable rubber composition including a partially hydrogenated unsaturated nitrile-conjugated diene copolymer having an iodine value of smaller than 25, a sulfur vulcanizer and a tellurium dithiocarbamate compound as a vulcanization promotor. This rubber composition provides a vulcanizate having reduced heat build-up, reduced compression set and high mechanical strength.

8 Claims, 1 Drawing Sheet

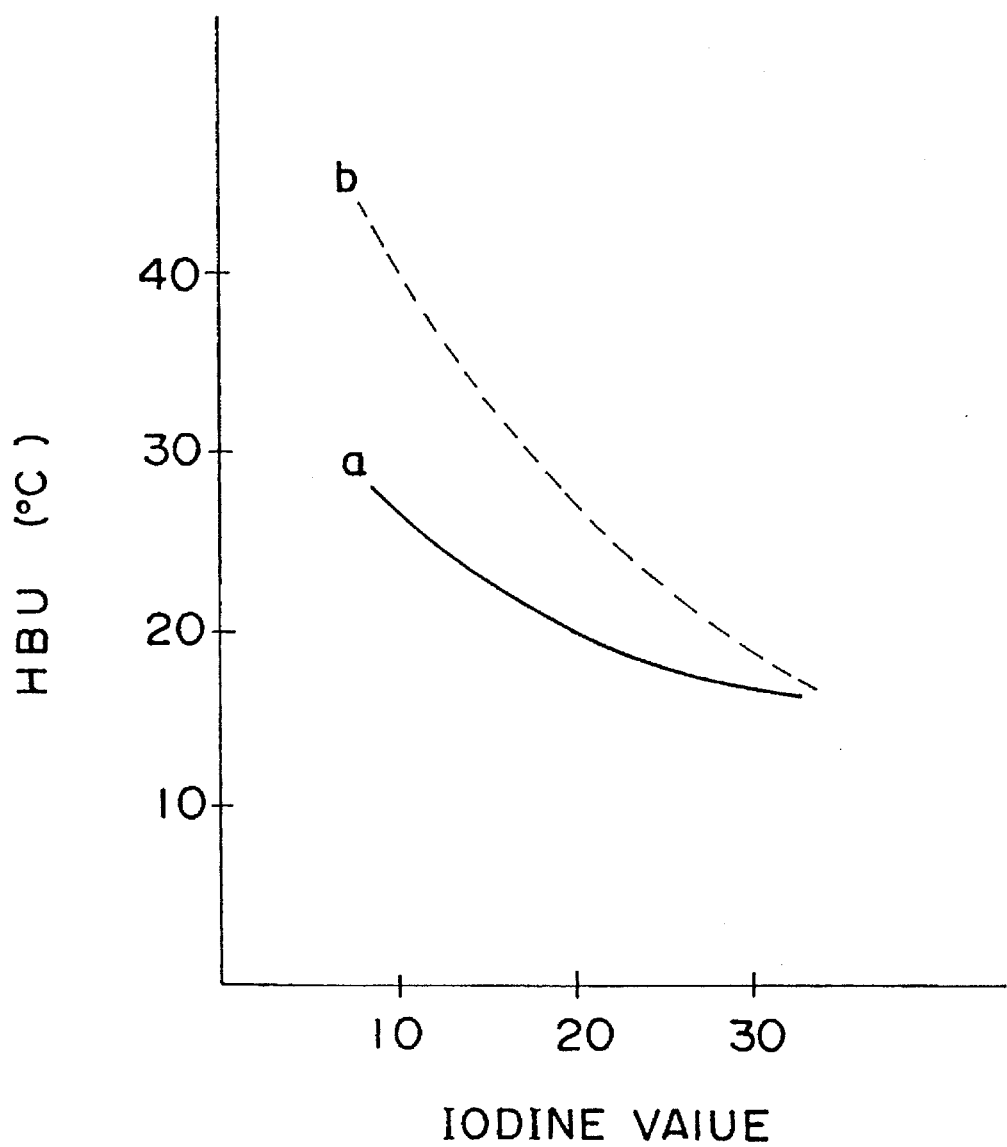
F I G. 1

VULCANIZABLE PARTIALLY HYDROGENATED NITRILE RUBBER COMPOSITION CONTAINING PARTIALLY HYDROGENATED UNSATURATED NITRILE-CONJUGATED DIENE COPOLYMER SULFUR VULCANIZER AND TELLURIUM DITHIOCARBAMATE VULCANIZATION PROMOTOR

This application is a continuation division of application Ser. No. 08/038,099, filed Mar. 30, 1993, now abandoned.

BACKGROUND OF THE INVENTION

1. Field of the Invention

This invention relates to a vulcanizable rubber composition comprising a partially hydrogenated unsaturated nitrile-conjugated diene copolymer.

The vulcanizable rubber composition is characterized as exhibiting a reduced heat build-up, a reduced compression set, high thermal resistance and a high mechanical strength.

2. Description of the Related Art

In recent years, there is an increasing demand for rubber parts having an enhanced thermal resistance which are set in the vicinity of an automobile engine, to cope with problems of the exhaust gas. Under this background, a partially hydrogenated unsaturated nitrile-conjugated diene copolymer rubber has been proposed and put to practical use.

The partially hydrogenated unsaturated nitrile-conjugated diene copolymer rubber is superior in ozone-resistance and thermal resistance to a conventional unsaturated nitrile-conjugated diene copolymer rubber. However, the partially hydrogenated unsaturated nitrile-conjugated diene copolymer rubber has only a reduced proportion of unsaturation and thus is difficult to vulcanize with a sulfur vulcanizer to obtain a vulcanizate having a high degree of vulcanization, and a good mechanical strength and compression set. To cope with this difficulty, proposals have been made to use a specific vulcanization promotor in combination with the vulcanizing agent.

SUMMARY OF THE INVENTION

An object of the present invention is to provide a rubber composition which is vulcanizable with a sulfur vulcanizer and capable of providing a vulcanizate exhibiting a reduced heat build-up and a reduced compression set as well as good thermal resistance and mechanical strength.

In accordance with the present invention, there is provided a rubber composition comprising a partially hydrogenated unsaturated nitrile-conjugated diene copolymer having an iodine value of smaller than 25, a sulfur vulcanizer and a tellurium dithiocarbamate compound as a vulcanization promotor, represented by the following formula (I):

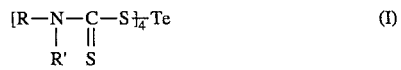

wherein R and R' independently represent an alkyl group having 1 to 8 carbon atoms or R and R' may form a heterocyclic ring together with the nitrogen atom to which R and R' are bound.

BRIEF DESCRIPTION OF THE DRAWING

FIG. 1 is a graph showing a relationship of the iodine value of a partially hydrogenated unsaturated nitrile-conjugated diene copolymer with the heat build-up (HBU) of a vulcanizate.

DESCRIPTION OF THE PREFERRED EMBODIMENTS

The partially hydrogenated unsaturated nitrile-conjugated nitrile rubber used in the invention has an iodine value smaller than 25, preferably from 1 to 20, and more preferably from 10 to 20, for the following reason. In FIG. 1, the solid line "a" corresponds to the rubber compositions containing a tellurium dithiocarbamate compound as a vulcanization promotor and the broken line "b" corresponds to the rubber compositions not containing a tellurium dithiocarbamate compound. As shown in FIG. 1, the heat build-up (HBU), expressed by the solid line "a", of a vulcanizate of a rubber composition containing a tellurium dithiocarbamate compound is lower than HBU, expressed by the broken line line "b" of a vulcanizate of a rubber composition not containing a tellurium dithiocarbamate compound. This HBU difference between the broken line and the solid line increases with a decrease of the iodine value, and becomes marked in the region where the iodine value is smaller than 25, especially in the region where the iodine value is not larger than 20.

The partially hydrogenated unsaturated nitrile-conjugated diene copolymer is prepared by partially hydrogenating conjugated diene units of an unsaturated nitrile-conjugated diene copolymer or an unsaturated nitrile-conjugated diene-ethylenically unsaturated monomer copolymer by a conventional method, for example, methods described in Japanese Examined Patent Publication No. 60-58242 and 62-61045. The unsaturated nitrile-conjugated diene copolymer and the unsaturated nitrile-conjugated diene-ethylenically unsaturated monomer copolymer are prepared by an emulsion polymerization or solution polymerization procedure.

As specific examples of the unsaturated nitrile, there can be mentioned acrylonitrile and methacrylonitrile. As specific examples of the conjugated diene, there can be mentioned 1,3-butadiene, 2,3-dimethylbutadiene, isoprene and 1,3-pentadiene. If desired, the unsaturated nitrile and the conjugated diene are copolymerized with other ethylenically unsaturated monomers. As specific examples of the copolymerizable monomers, there can be mentioned unsaturated carboxylic acids such as acrylic acid, methacrylic acid, itaconic acid and maleic acid, and salts thereof, alkyl esters of unsaturated carboxylic acids such as methyl acrylate, butyl acrylate, dimethyl maleate, diethyl fumarate, di-n-butyl fumarate and di-n-butyl itaconate, alkoxyalkyl esters of unsaturated carboxylic acids such as methoxy acrylate, ethoxyethyl acrylate and methoxyethoxyethyl acrylate, cyanoalkyl group-containing acrylates such as α-cyanoethyl acrylate, β-cyanoethyl acrylate, α-cyanopropyl acrylate, β-cyanopropyl acrylate, γ-cyanopropyl acrylate, cyanobutyl acrylate and cyanooctyl acrylate, hydroxyalkyl group-containing acrylates such as 2-hydroxyethyl acryalte and hydroxypropyl acrylate, acrylamide, methacrylamide, N-substituted acrylamides such as N-methylolacrylamide, N,N'-dimethylolacrylamide and N-ethoxymethylacrylamide, and N-substituted methacrylamides such as N-methylolmethacrylamide, N,N'-dimethylolmethacrylamide and N-ethoxymethylmethacrylamide. Provided that the purport of the invention is not injured, these copolymerizable ethylenically unsaturated monomers can be partially substituted by non-conjugated dienes such as vinylnorbornene, dicyclopentadiene and 1,4-hexadiene, and vinyl monomers such as styrene and vinylpyridine.

As specific examples of the partially hydrogenated unsaturated nitrile-conjugated diene copolymer used in the invention, there can be mentioned hydrogenated products of a butadiene-acrylonitrile copolymer rubber (hereinafter abbreviated to "NBR"), an isoprene-butadiene-acrylonitrile copolymer rubber and an isoprene-acrylonitrile copolymer rubber, and hydrogenated products of a butadiene-methyl acrylate-acrylonitrile copolymer rubber, a butadiene-acrylic acid-acrylonitrile copolymer rubber and a butadiene-di-n-butyl itaconate-acrylonitrile copolymer rubber.

The content of the bound unsaturated nitrile in the unsaturated nitrile-conjugated diene copolymer rubber is usually 5 to 60% by weight, preferably 10 to 50% by weight, based on the copolymer rubber.

The sulfur vulcanizer used in the invention includes sulfur and sulfur-donors such as tetramethylthiuram disulfide. The amount of the sulfur vulcanizer is usually 0.1 to 2 parts by weight, preferably 0.5 to 1 parts by weight, based on 100 parts by weight of the partially hydrogenated unsaturated nitrile-conjugated diene copolymer rubber.

In combination with the sulfur vulcanizer, a tellurium dithiocarbamate compound represented by the formula (I) is used as a vulcanization promotor. As the tellurium dithiocarbamate compound, there can be mentioned, for example, tellurium dithiocarbamate, tellurium dimethyldithiocarbamate, tellurium diethyldithiocarbamate, tellurium diamyldithiocarbamate and tellurium pentamethylenedithiocarbamate. The amount of the tellurium dithiocarbamate compound is preferably 0.1 to 5 parts by weight based on the 100 parts by weight of the partially hydrogenated unsaturated nitrile-conjugated diene copolymer.

Provided that the intended effect of the invention can be attained, other additives can be incorporated in the rubber composition of the invention. As the additives, there can be mentioned vulcanization promotors such as guanidine type, thiazole type and thiuram type vulcanization promotors, vulcanization promotor assistants such as zinc oxide, stearic acid, fillers and reinforcers such as carbon black, silica, talc and calcium carbonate, plasticizers, process oils, processing assistants and aging stabilizers.

The vulcanizable rubber composition of the invention is prepared by blending the above-mentioned partially hydrogenated nitrile-conjugated diene copolymer, sulfur vulcanizer, tellurium dithiocarbamate vulcanization promotor and optional additives by using a conventional mixer such as a roll or a Banbury mixer.

Vulcanized products made from the vulcanizable rubber composition of the invention exihibit a reduced heat build-up, a high mechanical strength and a reduced compression set, as well as good thermal resistance, oil resistance and ozone resistance, and have various uses.

As specific uses thereof, there can be mentioned, for example, belts such as a timing belt, a V-belt, a V-ribbed belt, a CVT-belt, sealing rubber articles such as O-ring, a packing and a gasket, bearing seals such as a crankshaft seal, a rotary seal for an accelerator, and a stem shaft seal, diaphragms, hoses such as an automobile fuel hose, a marine hose, a riser and a flow-line, cushioning materials, and vibration insulators.

The vulcanizable rubber composition of the invention will now be specifically described by the following examples.

In the examples, the dynamic permanent set was measured by a flexometer (supplied by B. F. Goodrich Co.) after a sample was rotated for 25 minutes at a temperature of 100° C. under a load of 25 pounds at a number of revolutions of 1,800/min. and at a vibrational amplitude of 0.175 inch. The other physical properties were determined according to JIS K-6301.

EXAMPLE 1

An acrylonitrile-butadiene copolymer rubber having a bound acrylonitrile content of 36% by weight, prepared by a conventional emulsion polymerization procedure, was dissolved in methyl isobutyl ketone, and the butadiene units of the copolymer rubber were partially hydrogenated by using a Pd/SiO$_2$ catalyst to give a partially hydrogenated acrylonitrile-butadiene copolymer rubber having an iodine value of 15 (i.e., a hydrogenation degree of 95%).

Using the thus-prepared partially hydrogenated acrylonitrile-butadiene copolymer rubber, vulcanizable rubber compositions "a" through "f" were prepared according to the recipes shown in Table 1 by using rolls.

TABLE 1

| Recipe | a | b | c | d | e | f |
|---|---|---|---|---|---|---|
| Hydrogenated NBR | 100 | 100 | 100 | 100 | 100 | 100 |
| Zinc oxide | 5 | 5 | 5 | 5 | 5 | 5 |
| Stearic acid | 1 | 1 | 1 | 1 | 1 | 1 |
| FEF carbon Black | 45 | 45 | 45 | 45 | 45 | 45 |
| Sulfur | 0.5 | 0.75 | 0.75 | 0.75 | 0.5 | 1.0 |
| Tetramethyl-thiuramdisulfide | 1.5 | 1.5 | 1.5 | 1.5 | 1.5 | 1.5 |
| 2-mercaptobenzo-thiazole | 0.5 | 0.5 | 0.5 | 0.5 | 0.5 | 0.5 |
| Tellurium diethyl-dithiocarbamate | — | — | 1.0 | 2.0 | 1.0 | 1.0 |

Each vulcanizable composition was vulcanized under pressure at 160° C. for 20 minutes to give a vulcanizate in the form of a sheet having a thickness of 2 mm. The physical properties of the vulcanizate sheet are shown in Table 2.

TABLE 2

|  | Comp. Example | | Example (Invention) | | | |
|---|---|---|---|---|---|---|
| Run No | 1 | 2 | 3 | 4 | 5 | 6 |
| Recipe | a | b | c | d | e | f |
| Tensile properties | | | | | | |
| Tensile strength (kgf/cm$^2$) | 294 | 294 | 277 | 273 | 270 | 272 |
| Elongation (%) | 590 | 530 | 500 | 490 | 540 | 470 |
| Tensile stress at 100% elongation (kgf/cm$^2$) | 93 | 111 | 121 | 123 | 99 | 135 |
| Hardness (JIS A) | 68 | 69 | 68 | 68 | 68 | 69 |
| Heat generating properties | | | | | | |
| Heat build-up (°C.) | 35 | 32 | 22 | 21 | 24 | 20 |
| Dynamic permanent set (%) | 4.5 | 3.3 | 2.3 | 1.9 | 3.0 | 2.0 |
| Permanent set (%) | 82 | 85 | 71 | 68 | 68 | 73 |
| Heat-aging properties *1 | | | | | | |
| ΔT$_B$ *2 (%) | −17 | −18 | −13 | −12 | −8 | −16 |
| ΔE$_B$ *3 (%) | −37 | −42 | −38 | −35 | −30 | −47 |
| ΔH$_S$ *4 (point) | +9 | +9 | +9 | +9 | +8 | +9 |

Note:
*1 Heat aging properties as measured after heated at 150°C. for 70 hours
*2 Tensile strength variation
*3 Tensile elongation variation
*4 Hardness variation As seen from Table 2, the vulcanizates of the compositions of the invention (Run No. 3 through 6) wherein a tellurium dithiocarbamate compound was used as a vulcanization promotor exhibited an enhanced tensile strength stress at 100% elongation, a reduced heat build-up and reduced permanent sets as compared with the vulcanizates of Run No. 1 and 2 wherein a tellurium dithiocarbamate compound was not used.

EXAMPLE 2

Using the same acrylonitrile-butadiene copolymer as that described in Example 1, three kinds of partially hydrogenated acrylonitrile-butadiene copolymers having an iodine value of 10, 20 and 30 were prepared in manners similar to that in Example 1.

Using each of the partially hydrogenated acrylonitrile-butadiene copolymers, vulcanizable rubber compositions were prepared according to recipe "b" and recipe "d" shown in Table 1 by kneading the respective mixtures by rolls.

The rubber compositions were vulcanized under pressure at 160° C. for 20 minutes to give vulcanizates of a sheet form having a thickness of 2 mm. The physical properties of the sheets were evaluated. The results are shown in Table 3.

The relationship of the heat build-up (HBU) of vulcanizates with the iodine value of partially hydrogenated acrylonitrile-butadiene copolymer is illustrated in FIG. 1, wherein a solid line "a" corresponds to Run No. 10, 11 and 12 (using recipe "d" containing a tellurium dithiocarbamate compound) in Table 3 and a broken line "b" corresponds to Run No. 7, 8 and 9 (using recipe "b" not containing a tellurium dithiocarbamate compound) in Table 3.

TABLE 3

|  | Comparative Example | | | Example | | Comp. Ex. |
| --- | --- | --- | --- | --- | --- | --- |
| Run No | 7 | 8 | 9 | 10 | 11 | 12 |
| Iodine value of HNBR | 10 | 20 | 30 | 10 | 20 | 30 |
| Recipe | b | b | b | d | d | d |
| Tensile properties |  |  |  |  |  |  |
| Tensile strength (kgf/cm$^2$) | 300 | 284 | 241 | 278 | 259 | 226 |
| Elongation (%) | 660 | 630 | 500 | 540 | 490 | 390 |
| Tensile stress at 100% elongation (kgf/cm$^2$) | 82 | 89 | 107 | 113 | 126 | 144 |
| Hardness (JIS A) | 68 | 68 | 69 | 69 | 69 | 70 |
| Heat generating properties |  |  |  |  |  |  |
| Heat build-up (°C.) | 40 | 27 | 19 | 27 | 19 | 17 |
| Dynamic permanent set (%) | 15.5 | 4.9 | 2.0 | 6.7 | 1.9 | 1.0 |
| Permanent set (%) | 92 | 82 | 72 | 72 | 65 | 60 |
| Heat-aging properties *1 |  |  |  |  |  |  |
| $\Delta T_B$ *2 (%) | −20 | −15 | −2 | −15 | −11 | +7 |
| $\Delta E_B$ *3 (%) | −30 | −37 | −50 | −34 | −41 | −46 |
| $\Delta H_S$ *4 (point) | +10 | +10 | +11 | +10 | +10 | +11 |

Note:
*1 Heat aging properties as measured after heated at 150°C. for 70 hours
*2 Tensile strength variation
*3 Tensile elongation variation
*4 Hardness variation As seen from Table 3 and FIG. 1, the vulcanized products of the compositions of the invention (Run No. 10 and 11) wherein a tellurium dithiocarbamate compound was used as a vulcanization promotor exhibited a reduced heat buildup and reduced permanent sets as compared with the vulcanized products of Run No. 7, 8 and 9 wherein a tellurium dithiocarbamate compound was not used.

When a partially hydrogenated acrylonitrile-butadiene copolymer having an iodine value not smaller than 25 is used (Run No. 9 and 12), the HBU reduction effect due to the tellurium dithiocarbamate compound is minor, and the thermal resistance of the vulcanized products is poor.

What is claimed is:

1. A vulcanizable rubber composition comprising a partially hydrogenated unsaturated nitrile-conjugated diene copolymer having an iodine value of 10 to 25, wherein said partially hydrogenated copolymer is a hydrogenated product of a copolymer rubber selected from the group consisting of a butadiene-acrylonitrile copolymer rubber, an isoprene-butadiene-acrylonitrile copolymer rubber, an isoprene-acrylonitrile copolymer rubber, a butadiene-methyl acrylate-acrylonitrile copolymer rubber, a butadiene-acrylic acid-acrylonitrile copolymer rubber and a butadiene-di-n-butyl itaconate-acrylonitrile copolymer rubber; a vulcanizer consisting of sulfur; and tellurium diethyldithiocarbamate, tellurium diamyldithiocarbamate or tellurium pentamethylenedithiocarbamate, as a vulcanization promoter.

2. A vulcanizable rubber composition according to claim 1 wherein the partially hydrogenated unsaturated nitrile-conjugated diene copolymer has an iodine value of 10 to 20.

3. A vulcanizable rubber composition according to claim 1 wherein the partially hydrogenated unsaturated nitrile-conjugated diene copolymer contains 5 to 60% by weight of bound unsaturated nitrile.

4. A vulcanizable rubber composition according to claim 1 wherein the sulfur vulcanizer is sulfur or a sulfur-donor and its amount is 0.1 to 2 parts by weight based on 100 parts by weight of the partially hydrogenated unsaturated nitrile-conjugated diene copolymer.

5. A vulcanizable rubber composition according to claim 1 wherein the amount of the tellurium dithiocarbamate compound is 0.1 to 5 parts by weight based on the weight of the partially hydrogenated unsaturated nitrile-conjugated diene copolymer.

6. A vulcanizable rubber composition according to claim 1, wherein the partially hydrogenated unsaturated nitrile-conjugated diene copolymer is a hydrogenated butadiene-acrylonitrile copolymer rubber.

7. A vulcanizable rubber composition according to claim 1, wherein the partially hydrogenated unsaturated nitrile-conjugated diene copolymer contains 10 to 50% by weight of bound unsaturated nitrile.

8. A vulcanizable rubber composition according to claim 1, wherein the tellurium dithiocarbamate compound is tellurium diethyldithiocarbamate.

* * * * *